(12) United States Patent
Tassone et al.

(10) Patent No.: US 6,820,430 B1
(45) Date of Patent: *Nov. 23, 2004

(54) METHOD AND APPARATUS FOR PROVIDING EVAPORATIVE COOLING AND POWER AUGMENTATION IN GAS TURBINES

(76) Inventors: Bruce A. Tassone, 1722 Ridgeway Rd., Havertown, PA (US) 19083; Wayne A. Tassone, 1396 Brookcroft Ln., Boothwyn, PA (US) 19061

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 463 days.

(21) Appl. No.: 09/351,218

(22) Filed: Jul. 12, 1999

(51) Int. Cl.$^7$ ................................. F02C 7/14
(52) U.S. Cl. ........................ 60/775; 60/39.53
(58) Field of Search ............................ 60/39.05, 39.53

(56) References Cited

U.S. PATENT DOCUMENTS

| | | | |
|---|---|---|---|
| 2,686,631 A | * | 8/1954 | Jordan .......................... 230/209 |
| 4,808,235 A | | 2/1989 | Woodson et al. |
| 4,926,620 A | | 5/1990 | Donle |
| 5,525,268 A | * | 6/1996 | Reens ......................... 261/78.2 |
| 5,622,044 A | * | 4/1997 | Bronicki .................. 60/39.182 |
| 5,867,977 A | * | 2/1999 | Zachary et al. ............ 60/39.53 |
| 6,012,279 A | * | 1/2000 | Hines .......................... 60/39.05 |
| 6,250,064 B1 | * | 6/2001 | Tomlinson ................. 60/39.05 |

OTHER PUBLICATIONS

EPRI Powering Progress, Technical Brief, Generation Group, "EPRI Technology to Enhance Combustion Turbine Output", unknown bibligraphy, 3 pages.*
Fortin, et al., "Gas Turbine Compressor Interstage Cooling Using Methanol", paper 83–GT–230 1983, The American Society of Mechanical Engineers, New York, NY, USA.
David Gordon Wilson, "The Design of High–Efficiency Turbomachinery and Gas Turbines", book, 1984, p. 25, The MIT Press, Cambridge, MA, USA.
Wetzel, et al., "Water Spray Injection of an Axial Flow Compressor", Proceedings of the Midwest Power Conference, vol. XI, 1949, pp. 376–380, Illinois Institute of Technology, Chicago, IL, USA.

* cited by examiner

Primary Examiner—Ehud Gartenberg
(74) Attorney, Agent, or Firm—Woodcock Washburn LLP

(57) ABSTRACT

A method for augmenting the net output of a gas turbine having an inlet for acquiring a fluid such as air to be compressed is disclosed. The method comprising the following steps: providing a first flow of liquid water comprising liquid droplets to the fluid to be compressed at a first location upstream of the gas turbine for providing evaporative cooling; and providing a second flow of liquid water comprising liquid droplets to the intake air to be compressed at a second location downstream of the first location and proximate to the gas turbine for providing power augmentation.

9 Claims, 8 Drawing Sheets

METHOD AND APPARATUS FOR PROVIDING EVAPORATIVE COOLING AND POWER AUGMENTATION IN GAS TURBINES

FIELD OF THE INVENTION

The present invention is directed to a system for augmenting power in gas turbines. In particular, the present invention is directed to a system for providing both power augmentation and evaporative cooling in gas turbines.

BACKGROUND OF THE INVENTION

Gas powered turbines are utilized in a variety of useful applications. Gas turbines are frequently used in marine applications, power generation and chemical processing. Land-based gas turbine power generation facilities can also provide combined cycle benefits when a heat recovery unit is utilized to generate steam from the exhaust gas generated by the turbine and a steam turbine is then operated by that steam.

The term "gas turbine" traditionally has referred to any turbine system having a compression section, combustion section and turbine section. In recent years, the term "combustion turbine" has more frequently been used to reference the technology. In this regard, the term "gas turbine" as used herein represents both the traditionally used term and the term "combustion turbine".

Gas turbines typically comprise a compressor section for compressing inlet air, a combustion section for combining the compressed inlet air with fuel and for oxidizing the fuel, and a turbine section where the energy from the hot gas produced by the oxidation of the fuel is converted into work or power. Typically, in operation, natural gas, kerosene or synthetic gas (such as carbon monoxide) is fed as fuel into the combustion section. The rotor, comprising a rotor shaft, attached turbine section, rotor blades and attached compressor section rotor blades, then mechanically powers the compression section or a compressor used in the chemical process or electrical generation. The exhaust gas from the turbine section can either be used to achieve thrust or serve as a source of heat or energy. In some cases, the exhaust gas is discarded.

Certain turbine sections employ the use of fluid-cooled rotor blades for either pressurized air, steam or the like, which is then passed through internal cooling cavities within the rotor blades which are used in the turbine section. This facilitates higher temperature output from the combustion section.

Moreover, gas turbine compressors must be cleaned periodically to remove the build-up of particulates on internal components. Some of this cleaning can be performed without a full shutdown of the gas turbine, and materials such as water, ground pecan hulls, or chemical cleaning mixtures can be either sprayed, blown, or otherwise input into the inlet of the gas turbine after the gas turbine has been operationally configured for such a cleaning operation. Such a chemical mixture is disclosed in U.S. Pat. No. 4,808,235 entitled "CLEANING GAS TURBINE COMPRESSORS" issued on Feb. 28, 1989 to Woodson, et al. Other systems for minimizing build-up of particulates on internal components of gas turbines focus on cleaning of the gas turbine inlet air as is, for instance, disclosed in U.S. Pat. No. 4,926,620 entitled "CLEANING GAS TURBINE INLET AIR" issued on May 22, 1990 to Donle.

Materials such as water can also be added when the gas turbine is operating under full load to augment the power output capability of the gas turbine above the output achievable with humidified air. This is referred to as "wet compression." Wet compression enables power augmentation in gas turbine systems by reducing the work required for the compression of the inlet air. This thermodynamic benefit is realized within the compressor of the gas turbine through "latent heat intercooling", i.e., where water (or some other appropriate liquid) added to the air inducted into the compressor cools that air, through evaporation, as the air with the added water is compressed. The added water effectively functions as an "evaporative liquid heat sink" in this regard.

The wet compression technique thus saves an incremental amount of work, which would have otherwise been needed to compress air not containing the added water, and provides an incremental amount of energy available to either drive the load attached to the gas turbine (in the case of a single shaft machine) or to increase the compressor speed to provide more mass flow (which can have value in both single shaft and dual shaft machines).

An additional incremental contribution to power augmentation is also realized in the turbine section by a small increase in mass flow provided by the added vaporized liquid. A further incremental contribution to power augmentation also arises from an increase in air flow which has been noted to occur with a first injection per minute increment of water in a large land-based power gas turbine. This rate may vary according to engine size. It should be noted that additional fuel is required to raise the temperature of the cooled air/steam mixture discharged from the compressor to the firing temperature of the gas turbine. However, the net energy realized from the wet compression effect is greater than the energy cost of the additional fuel needed, resulting in a net addition of power to the system as a whole.

The power augmentation benefits of wet compression have been well discussed in the prior art. As noted by David G. Wilson in "The Design of High-Efficiency Turbomachinery and Gas Turbines" (1984, Massachusetts Institute of Technology), a six stage centrifugal compressor used in a 1903 vintage turbine built by Aegidius Elling injected water between compressor stages.

Also in the 1940s, an overview of the principles of wet compression were reported by "Water Spray Injection of an Axial Flow Compressor" by I. T. Wetzel and B. H. Jennings (Proceedings of the Midwest Power Conference, Illinois Institute of Technology, Apr. 18–20, 1949, pages 376 to 380); which is incorporated by reference herein for purposes of describing the background of the present invention. The Wetzel and Jennings article teaches the use of "water . . . sprayed into the inlet duct just upstream from the compressor through four nozzles." No actual results using a gas turbine, however, were reported in this article.

In the development of jet aircraft, wet compression power augmentation using alcohol or water/alcohol mixtures has also been of interest as a method for thrust augmentation as noted in American Society of Mechanical Engineers article 83-GT-230 entitled "Gas Turbine Compressor Interstage Cooling using Methanol" (ASME, New York, 1983) by J. A. C. Fortin and J. F. Bardon. The Fortin-Bardon article points to concerns with wet compression ". . . that the liquid droplets not cause serious erosion of the compressor blades."

The above comment from the Fortin-Bardon article, and another comment in the Wetzel-Jennings article that "there was no evidence of blade erosion although admittedly the tests were of short duration" help to highlight a major concern regarding liquid erosion caused by wet compression, which has contributed to preventing its full application (despite the technology's very significant benefit). Indeed, there are a number of risks to a gas turbine system when wet compression power augmentation is used to improve its operational performance.

As noted, one risk is derived from blade erosive effects. Another problem, particularly in large gas turbine systems, relates to localized and non-uniform cooling problems due to the non-uniform distribution of the added water within the compressor. This can distort the physical components of the gas turbine system in such a way as to cause damage from rubbing of the rotor against the inner wall of the housing and associated seals.

A further significant problem arises from the possibility of thermal shock if: (1) the gas turbine has essentially achieved thermodynamic equilibrium under full load; and (2) the liquid addition is abruptly terminated without feed-forward compensation to the energy being added to the gas turbine. This problem is related to a potentially damaging and abrupt transient in the internal operating temperature of the turbine section if the evaporative liquid heat sink is removed in this manner.

Another problem arises from the possibility that components of the liquid addition system may break away and impact against the relatively delicate moving parts of the gas turbine system. Still another problem is created by the fact that gas turbine components will foul from impurities in the liquid added to the compression inlet air, as these impurities are deposited on the gas turbine components as a result of evaporation of the liquid in which they had been dissolved.

With particular regard to land-based gas turbine power generation facilities and chemical processing facilities, the above risk factors, the substantial investment in the gas turbines, and non-linear, inherent scale-up considerations have collectively prevented the benefits of wet compression from being realized.

U.S. Pat. No 5,867,977 assigned to the Dow Chemical Company, discloses a wet compression power augmentation apparatus and method for adding a mass flow of water particles to a gas turbine preferably by use of a spray rack group assembly having at least one spray rack water pipe and at least one spray rack water nozzle. As taught by this patent, water mass flow is added preferably in increments such that operationally-induced thermal transients within the gas turbine are sufficiently minimized to preserve the structural integrity of the gas turbine. An optical pyrometer is used to monitor the temperature profile of fluid-cooled rotor blades in the turbine section and to detect clogging of cooling pathways in those rotor blades from impurities in the liquid added through the wet compression. The patent further discloses a novel system to guard against the possibility of icing. The patent further discloses a deformation measurement device which is preferably a laser emitter and laser target measuring system mounted to the exterior of the gas turbine housing to detect deformation in the housing of the gas turbine from associated cooling effects of the wet compression technique, and periodic addition of heat and humidity, preferably steam, to the compressor inlet.

While the system disclosed in this patent purports to disclose a power augmentation system, it does not provide adequate evaporative cooling nor an even distribution of fluid flow and mass flow balance. Moreover, this patent discloses a single location where water spray is input into the gas turbine via a spray rack. The spray rack assembly is cumbersome and interferes with the proper flow of air.

It has been shown by the present applicants that by dividing the input of water or fluid at two locations upstream of the turbine, both evaporative cooling and power augmentation can be achieved, thereby yielding a greater increase in power than provided by single station systems such as disclosed in U.S. Pat. No. 5,867,997. This eliminates hot spots and vibration. This further provides better control over droplet size because the dwell time is short. The present applicants have further designed a novel ring shaped nozzle configuration, and nozzle which provides spray without obstructing or interfering with flow of air (fluid) into the system. These and other objects of the present invention will become apparent from the detailed description which follows.

SUMMARY OF THE INVENTION

Figure 1:
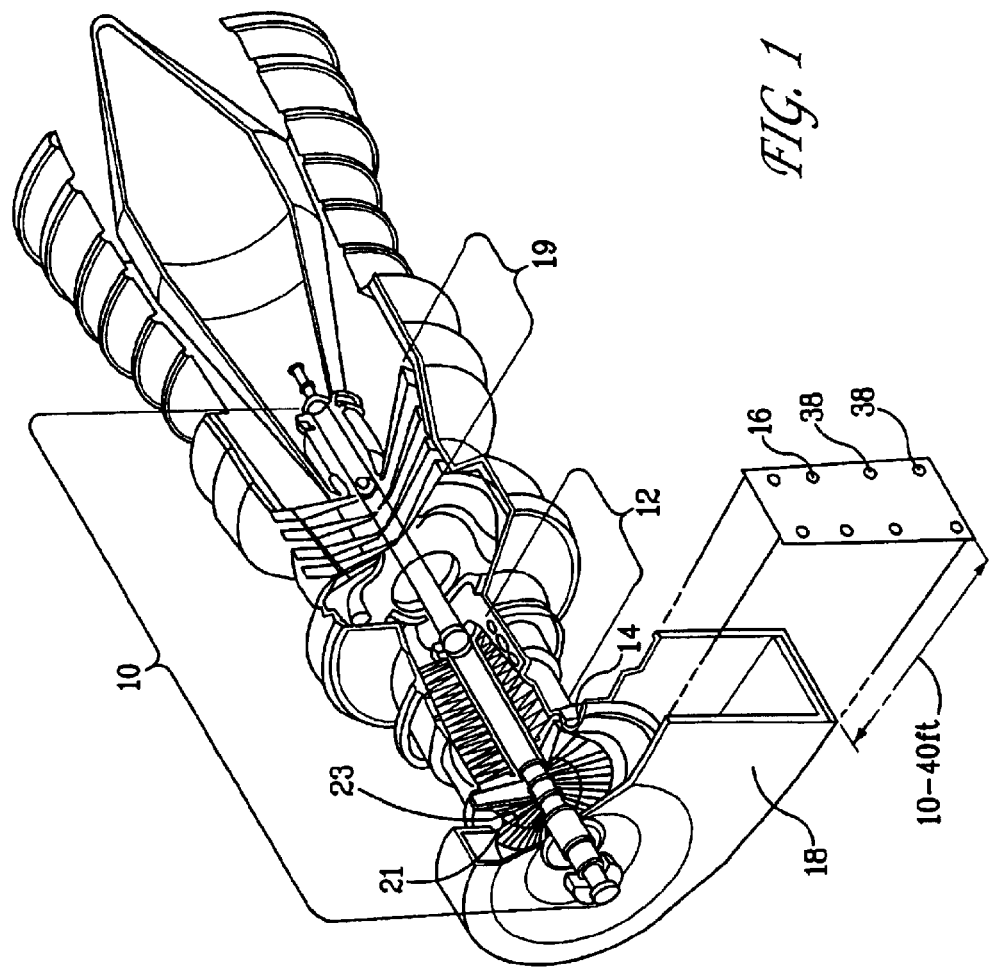
FIG. 1 is a broken away elevational view of the power augmentation system of the present invention in use with a power turbine.

In accordance with the present invention, a method for augmenting the net output of a fuel turbine having an inlet for acquiring a fluid such as air to be compressed is disclosed. The invention comprises the following steps: providing a first flow of liquid water comprising liquid droplets to the fluid to be compressed at a first location upstream of the gas turbine for providing evaporative cooling; and providing a second flow of liquid water comprising liquid droplets to the intake air to be compressed at a second location downstream of the first location and proximate to the gas turbine for providing power augmentation.

In a further embodiment, the invention comprises a method for providing evaporative cooling and for augmenting the net output of a fuel turbine having an inlet for acquiring a fluid such as air to be compressed, comprising the following steps: providing a first flow of liquid water comprising liquid droplets to the fluid to be compressed at a first location at a location between 10 and 40 feet upstream of the gas turbine for providing evaporative cooling to the fluid; and providing a second flow of liquid water comprising liquid droplets to the intake air to be compressed at a second location downstream of the first location and adjacent to the gas turbine for providing power augmentation to the fluid.

The present invention is also directed to an apparatus for providing evaporative cooling and for augmenting the net output of a fuel turbine having an inlet for acquiring a fluid such as air to be compressed, comprising: means for providing a first flow of liquid water comprising liquid droplets to the fluid to be compressed at a first physical location between approximately 10 and 40 feet upstream of the gas turbine for providing evaporative cooling to the fluid; and means for providing a second flow of liquid water comprising liquid droplets to the intake air to be compressed at a second location downstream of the first location and adjacent to the gas turbine for providing power augmentation to the fluid.

In still a further embodiment, the invention is an apparatus for providing evaporative cooling and for augmenting the net output of a fuel turbine having an inlet for acquiring a fluid such as air to be compressed, comprising: fluid control means for providing liquid to the apparatus; means in communication with said fluid control means for providing a first flow of liquid water comprising liquid droplets to the fluid to be compressed at a first physical location between approximately 10 and 40 feet upstream of the gas turbine for providing evaporative cooling to the fluid; and means in communication with said fluid control means for providing a second flow of liquid water comprising liquid droplets to the intake air to be compressed at a second location downstream of the first location and adjacent to the gas turbine for providing power augmentation to the fluid.

DETAILED DESCRIPTION OF THE PRESENT INVENTION

The present invention is directed to a system for both augmenting power and providing evaporative cooling in a gas turbine. In particular, the present invention is directed to a system for augmenting power in a gas turbine by dividing the flow of fluid (water) for both evaporative cooling and power augmentation and thereby providing a net increase in power over other systems.

Figure 2:
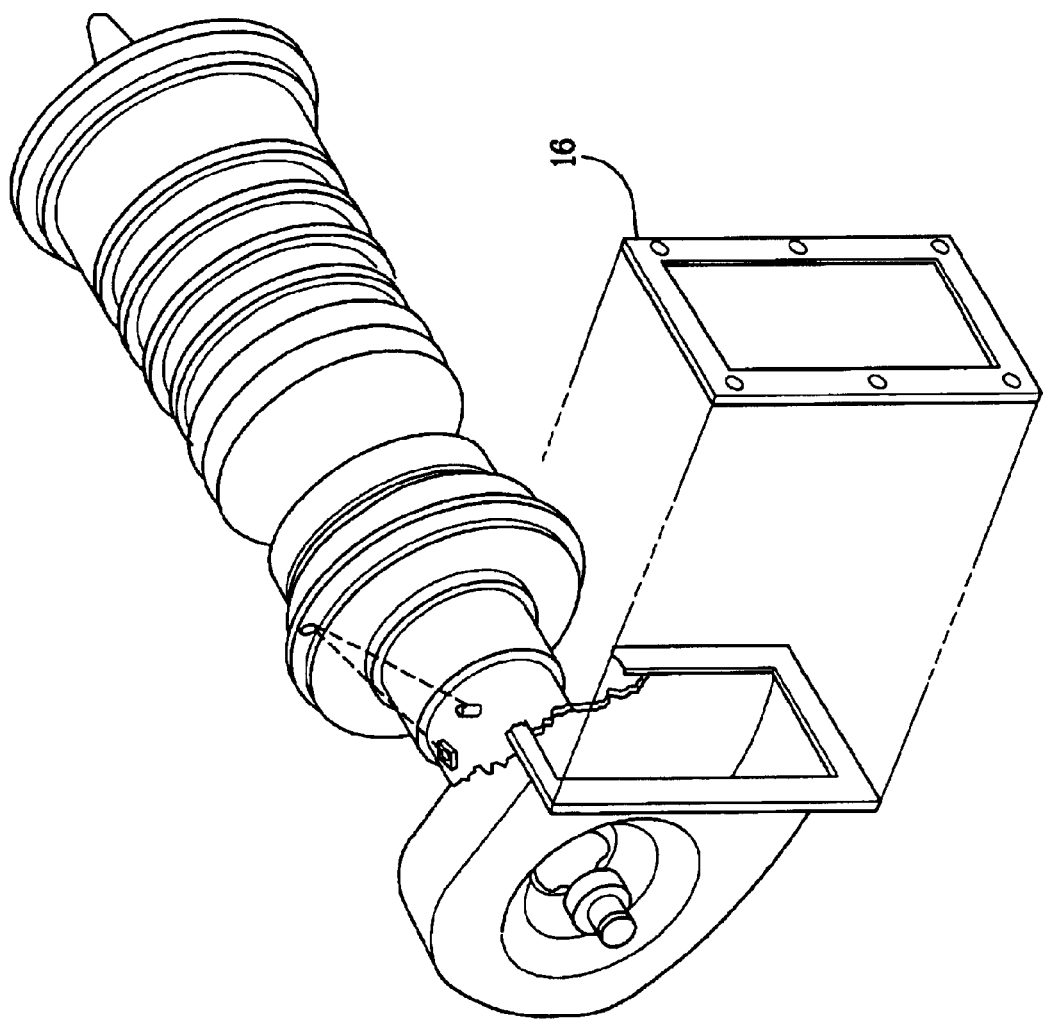
FIG. 2 is an elevational view of a power augmentation system of the present invention.

As shown in FIGS. 1 and 2, a typical gas turbine power generation system, which is the operational environment of the present invention, is shown and described. The gas turbine power generation system shown in FIGS. 1 and 2 is typical of that used to generate electronic power from the combustion of fuel with air. This configuration is exemplary of a facility which may employ the apparatus and method of the present invention so as to achieve benefits through the addition of liquid water to the working fluid (air or humidified air).

As shown, the gas turbine power generation facility comprises a gas turbine or gas turbine engine 10 which includes an axial-flow compressor or axial compressor section 12. The axial compressor section 12 includes a compressor inlet 14 for acquiring a working fluid which typically comprises air or humidified air. The gas turbine engine 10 and axial compressor section 12 are shown for illustrative purposes only and it is to be appreciated that the present invention may be practiced on other types of gas turbine engines known to the art.

Inlet section 14, via an inlet air duct 18, is situated between the evaporative cooling station 16 and a compressor inlet 21. The inlet air duct 18 comprises a longitudinally extending tube which links the evaporative cooling station 16, to be described below, with the compressor inlet 21. A power augmentation station 23 to be described below is situated proximate to the compressor inlet 21.

The operation of the gas turbine engine is conventional and well known to the art. In general, after entering the compressor inlet 21, the air (fluid) is compressed in the axial compressor section by a series of compressor stages. After compression, the compressed air then flows in the combustion chamber in the combustion section where it is mixed with fuel and the fuel is combusted to generate a hot pressurized gas used for driving the turbine section 19. The turbine section 19 has a series of turbine section stages which incrementally (1) promote the energy of the hot pressurized gas into work manifested as a rotating rotor, and (2) generating an exhaust gas having a lower temperature than the hot pressurized gas which entered the respective turbine section stage. The exhaust gas from the first such turbine section stage then becomes the hot pressurized gas for the second stage.

Figure 3:
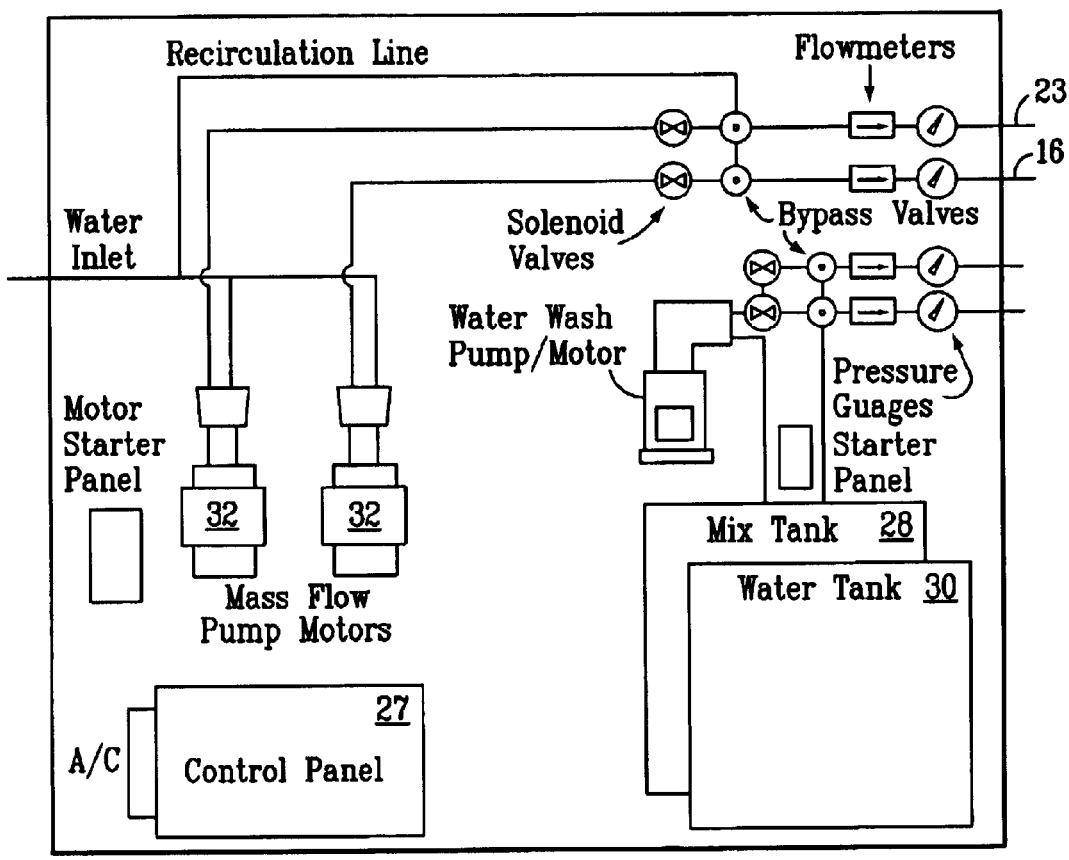
FIG. 3 is a block diagram of a fluid control and supply system in accordance with the present invention.

Referring now to FIG. 3, an embodiment of a fluid delivery system 26 in accordance with the present invention is shown and described in detail. The fluid delivery system functions to provide fluid (e.g. water) to evaporative station 16 and power augmentation station 23.

In a most specific embodiment, the system comprises a mass flow delivery system comprising a control panel 27 with on-line cleaning capability from upper tank 28 for de-ionized and de-mineralized water and a lower tank for mixed solutions 30. After the upper tank 28 is filled to the fill line with concentrate, the de-ionized/de-mineralized water is then transferred to the lower tank 30 via gravity for mixing. The system includes a pumping station 32 which pumps fluid to the evaporative station 16 and power augmentation station 23. An exemplary system for providing fluid is the Semi-Automatic Fluid Delivery System produced by Mendit Chemical, assignee of the present invention.

Figure 5:
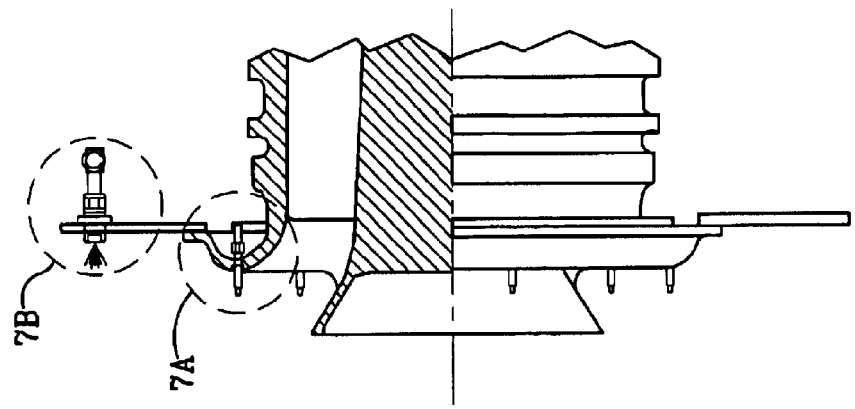
FIGS. 4–5 illustrate the elements of power augmentation station of the present invention.
Figure 4:
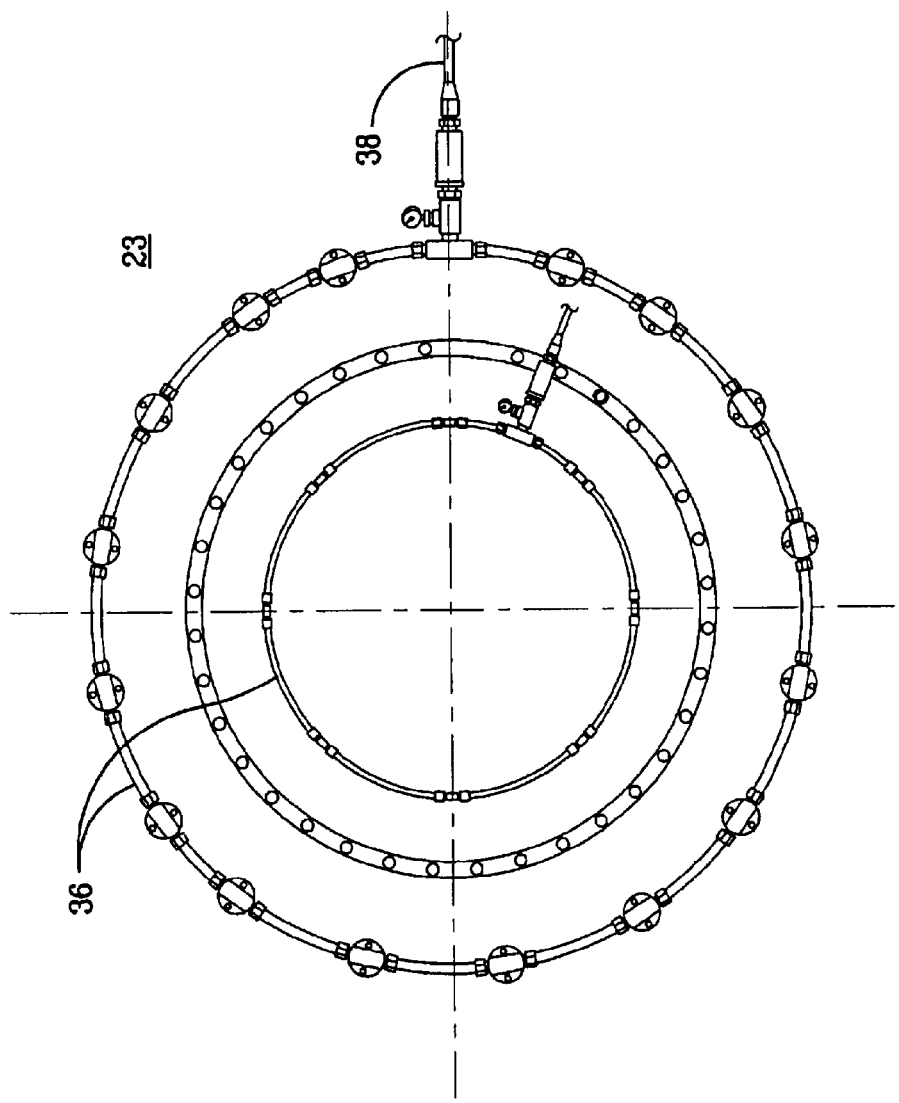
Figure 6A:
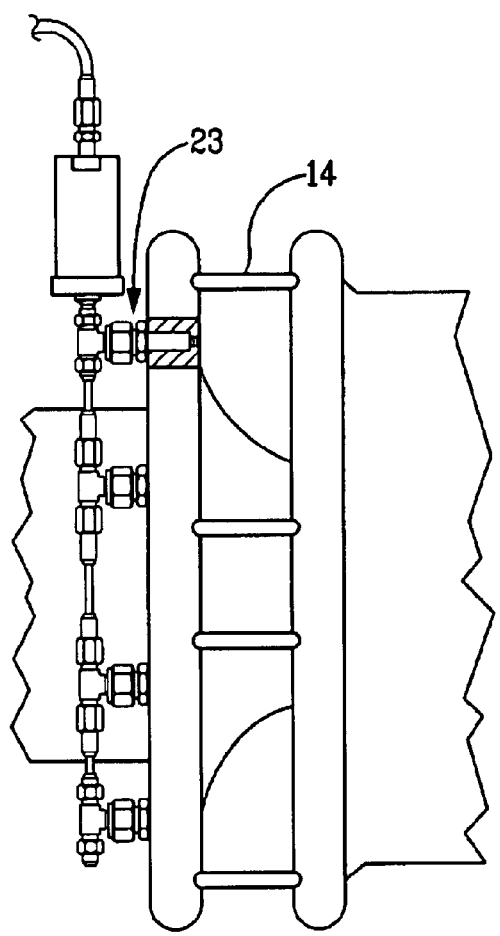
FIG. 6A is a side elevational view of a fore-mounted power augmentation station.
Figure 6B:
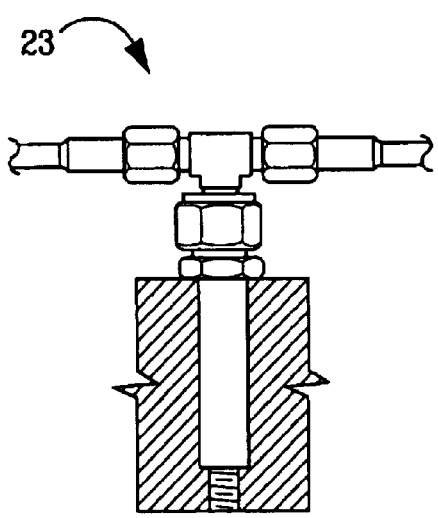
FIG. 6B is an enlarged view of the circled portion shown in FIG. 6A.
Figure 6C:
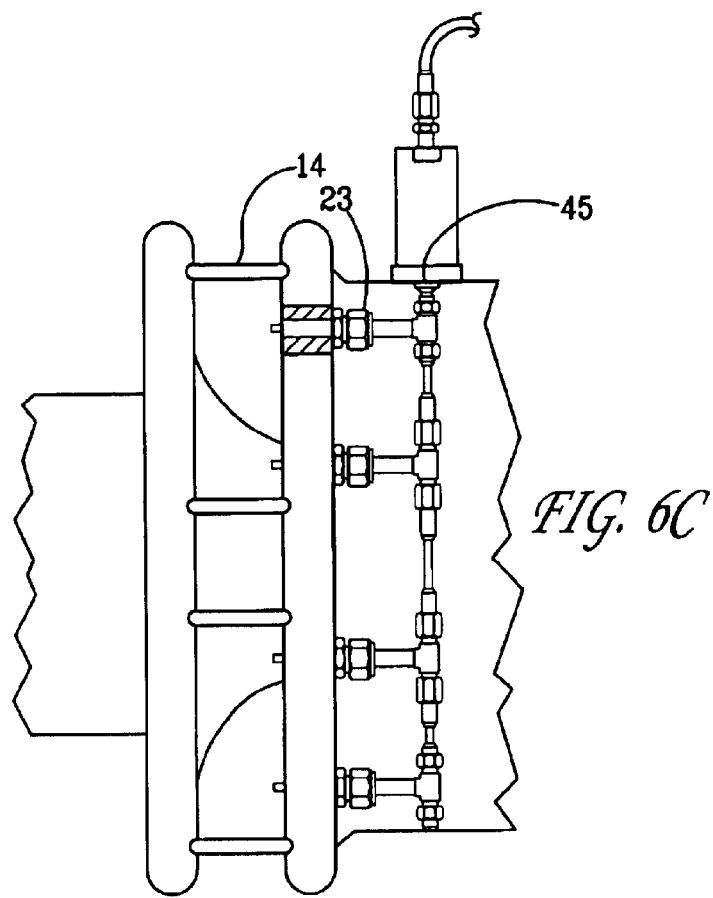
FIG. 6C is a side elevational view of an aft-mounted power augmentation station.
Figure 6D:
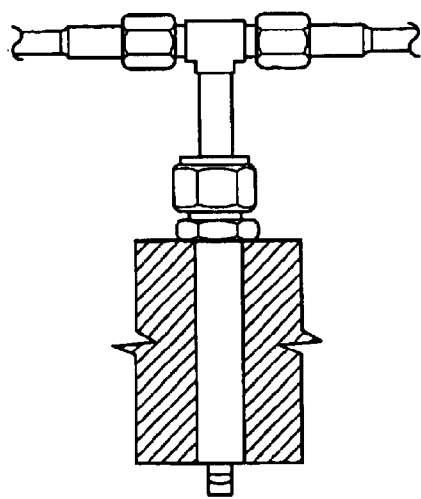
FIG. 6D is an enlarged view of the circled portion shown in FIG. 6C.

Referring now to FIGS. 4–6, the configuration of the power augmentation station 23 is detailed. As noted above, the power augmentation station is situated proximate to the compressor inlet 14. The location of the power augmentation station eliminates hot spots and vibration, and provides better control over droplet size because dwell time is short. The system comprises at least one and preferably multiple concentric rings 36 having a plurality of nozzles 38 attached thereto. The nozzle ring 36 is designed to meet OEM specifications and standards for fluid delivery.

Figure 7B:
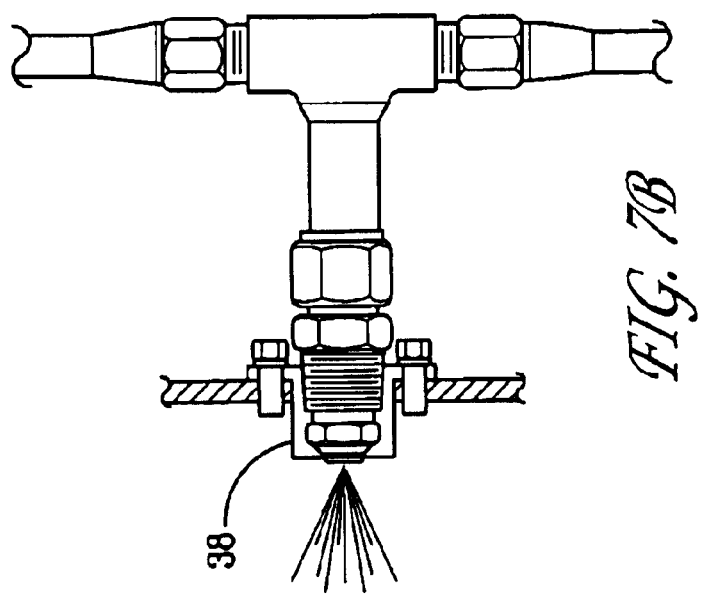
FIGS. 7A and 7B illustrate alternative orientation embodiments of the nozzles of the present invention.
Figure 7A:
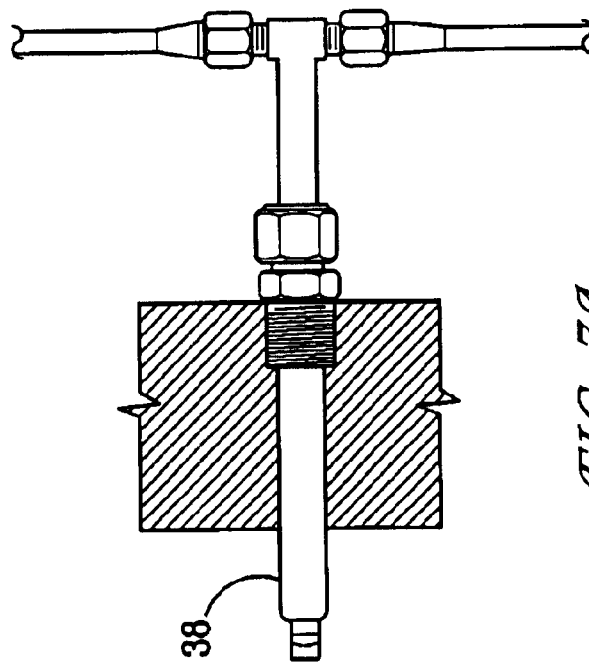
Figure 8:
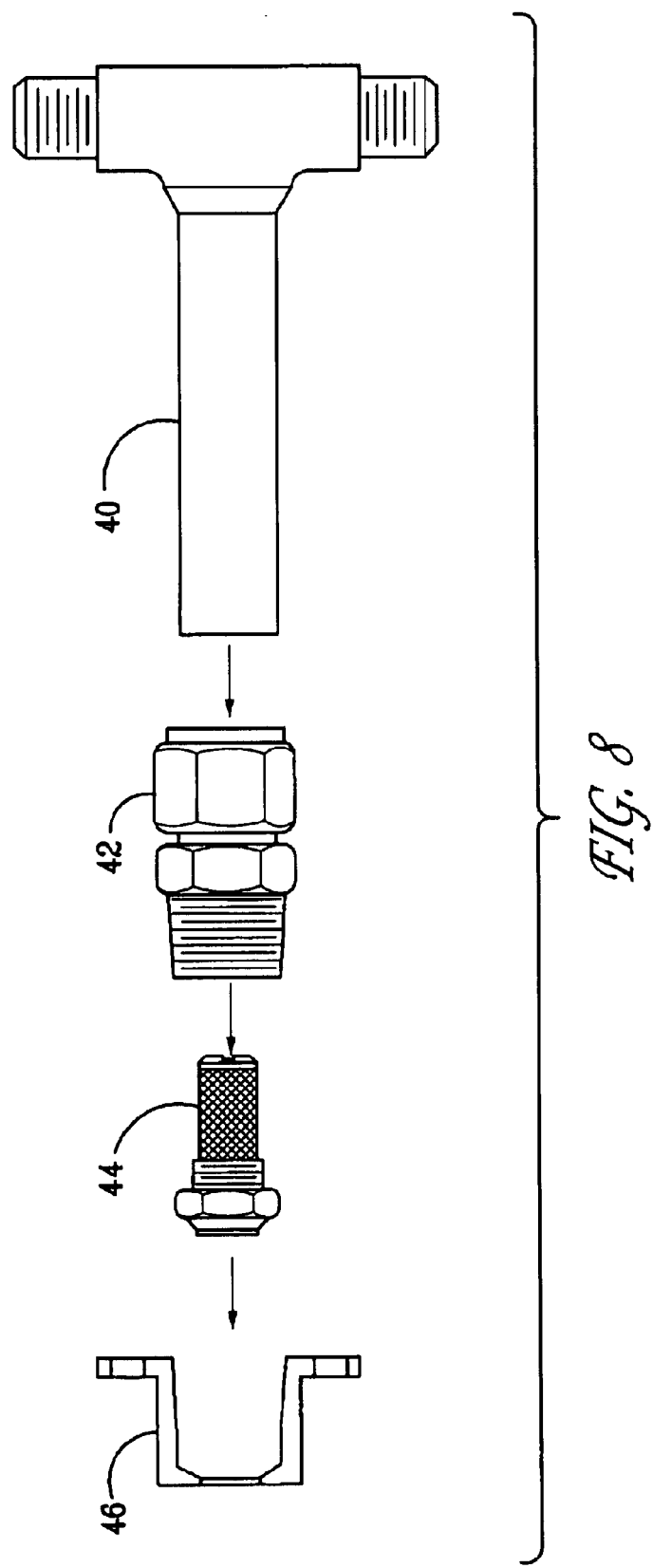
FIG. 8 is an exploded view of a nozzle assembly used in the present invention.

The spray nozzles 38 produce a precise specified flow rate, consistent droplet size and fan patterns to ensure full and uniform fluid injection and migration through the compressor. The system comprises an on-line filter which prevents contaminants from clogging nozzle orifices. The filter elements can be easily replaced without shutdown. As shown in FIG. 8, the nozzle comprises a nozzle body 40, swage lock 42, nozzle tip 44 and boss 46. As shown in FIGS. 7A and 7B, nozzles 38 may either extend parallel to the engine centerline and therefore the direction of flow or they may extend perpendicular to the centerline. The power augmentation station may be mounted at aft 45 of the compression section. FIG. 6 illustrates a clearing system which is shown mounted in both a fore and aft position.

A critical feature of the present invention is the application of evaporative cooling separate from power augmentation to avoid agglomeration of water particles. Fluid is thus divided between two stations 16, 23 to create both evaporative cooling and inner cooling for power augmentation.

As shown, the evaporative cooling is performed at station 16. Referring now to FIGS. 1 and 2, the evaporative cooling station 16 is within the duct 18 and upstream of the power augmentation station. The evaporative cooling station 23 16 is preferably set between 10 and 40 feet upstream of the power augmentation station 23. This set of nozzles provides evaporative cooling and will typically inject approximately 4.5 to 7 gallons of water per minute depending upon temperature and humidity.

Table 1 illustrates that depending upon the humidity and temperature, the number of gallons per minute of water at the evaporative cooling station 16 which is required. This liquid is diverted from the flow provided to the power augmentation station 23. As shown, no evaporative cooling is required below 50 degree F. At between 50 and 55 degrees and below 60% relative humidity, 7.5 gallons of evaporative cooling is required. There is therefore a positive and direct correlation between the flow of evaporative cooling and the temperature and humidity.

TABLE I

| Temperature | W191 Mass FLow Settings (GPM) @ Relative Humidity Levels (%) | | | | | | | | |
|---|---|---|---|---|---|---|---|---|---|
| Degrees F. | 0–60% | 61–65% | 66–70% | 71–75% | 76–80% | 81–85% | 86–90% | 91–95% | 96–100% |
| 50 or Lower | 0 | 0 | 0 | 0 | 0 | 0 | 0 | 0 | 0.00 |
| 50–55 | 7.50 | 7.50 | 7.50 | 7.50 | 7.50 | 7.00 | 7.00 | 6.50 | 6.50 |
| 56–60 | 7.50 | 7.50 | 7.50 | 7.50 | 7.50 | 7.00 | 7.00 | 6.50 | 6.50 |
| 61–65 | 7.50 | 7.50 | 7.50 | 7.50 | 7.50 | 7.00 | 7.00 | 6.50 | 6.00 |
| 66–70 | 7.50 | 7.50 | 7.50 | 7.50 | 7.50 | 7.00 | 6.50 | 6.00 | 5.50 |
| 71–75 | 7.50 | 7.50 | 7.50 | 7.50 | 7.00 | 6.50 | 6.00 | 5.50 | 5.00 |
| 76–80 | 7.50 | 7.50 | 7.50 | 7.00 | 7.00 | 6.50 | 6.00 | .50 | 5.00 |
| 81–85 | 7.50 | 7.50 | 7.50 | 7.00 | 6.50 | 6.00 | 5.50 | 5.00 | 4.50 |
| 86–90 | 7.50 | 7.50 | 7.50 | 7.00 | 6.50 | 6.00 | 5.50 | 5.00 | 4.50 |
| 91–95 | 7.50 | 7.50 | 7.50 | 7.00 | 6.50 | 6.00 | 5.50 | 5.00 | 4.50 |
| 96–100 | 7.50 | 7.50 | 7.50 | 7.00 | 6.50 | 6.00 | 5.50 | 5.00 | 4.50 |
| 101–105 | 7.50 | 7.50 | 7.50 | 7.00 | 6.50 | 6.00 | 5.50 | 5.00 | 4.50 |
| 106–110 | 7.50 | 7.00 | 7.50 | 7.00 | 6.50 | 6.00 | 5.84 | 5.70 | 4.50 |

The present invention has been described with reference to the enclosed Figures and above discussed preferred embodiment. It is to be appreciated that the true nature and scope of the present invention is to be determined with reference to the claims appended hereto.

What is claimed is:

1. In a gas turbine having a multistage compressor compressing a flow of air, the compressor having an inlet, the flow of air being directed to the compressor inlet by a duct, a method of increasing power output from the gas turbine by both evaporative cooling of the air prior to compression and intercooling of the air during compression, comprising the steps of:
   a) introducing a first stream of water droplets into the flow of air at a first location in the duct, the first location being sufficiently far upstream of the compressor inlet such that at least a portion of the water droplets in the first stream of water droplets evaporate before reaching the compressor inlet, whereby the air flowing through the duct is cooled and humidified prior to reaching the compressor inlet by evaporation of the first stream of water droplets; and
   b) introducing a second stream of water droplets into the flow of cooled and humidified air prior to compression thereof at a second location downstream from the first location, the second location being sufficiently proximate to the compressor inlet so that at least a major portion of the water droplets in the second stream of water droplets do not evaporate before reaching the compressor inlet, whereby the air being compressed in the compressor is intercooled by evaporation of droplets from the second stream of water droplets during compression thereof.

2. The method of claim 1 wherein the volume of water in the first stream of water droplets is proportional to the ambient temperature and humidity of the flow of air entering the duct.

3. The method of claim 1 wherein the first location at which the first steam of water droplets is introduced is between approximately 10 and 40 feet upstream of the compressor inlet.

4. The method of claim 1 wherein the second location is sufficiently proximate to the compressor inlet so that at least the major portion of the water droplets in the second stream of water droplets that do not evaporate before reaching the compressor inlet also do not agglomerate before reaching the compressor inlet.

5. The method of claim 1 wherein the second location is sufficiently proximate to the compressor inlet so that substantially all of the water droplets in the second stream of water droplets do not evaporate prior to reaching the compressor inlet.

6. An apparatus for increasing power output in a gas turbine, having a duct directing air to an inlet of a multistage compressor, by both evaporative cooling of the air prior to compression and intercooling of the air during compression, comprising the steps of:
   a) means for introducing a first stream of water droplets into the flow of air at a first location in the duct, the first location being sufficiently far upstream of the compressor inlet such that at least a portion of the water droplets in the first stream of water droplets evaporate before reaching the compressor inlet, whereby the air flowing through the duct is cooled and humidified prior to reaching the compressor inlet by evaporation of the first stream of water droplets; and
   b) means for introducing a second stream of water droplets into the flow of cooled and humidified air prior to compression thereof at a second location downstream from the first location, the second location being sufficiently proximate to the compressor inlet so that at least a major portion of the water droplets in the second stream of water droplets do not evaporate before reaching the compressor inlet, whereby the air being compressed in the compressor is intercooled by evaporation of droplets from the second stream of water droplets during compression thereof.

7. The apparatus of claim 6 wherein the first location at which the first steam of water droplets is introduced is between approximately 10 and 40 feet upstream of the compressor inlet.

8. The apparatus of claim 6 wherein the second location is sufficiently proximate to the compressor inlet so that at least the major portion of the water droplets in the second stream of water droplets that do not evaporate before reaching the compressor inlet also do not agglomerate before reaching the compressor inlet.

9. The apparatus of claim 6 wherein the second location is sufficiently proximate to the compressor inlet so that substantially all of the water droplets in the second stream of water droplets do not evaporate prior to reaching the compressor inlet.

* * * * *

UNITED STATES PATENT AND TRADEMARK OFFICE
CERTIFICATE OF CORRECTION

PATENT NO. : 6,820,430 B1
DATED : November 23, 2004
INVENTOR(S) : Tassone et al.

It is certified that error appears in the above-identified patent and that said Letters Patent is hereby corrected as shown below:

Column 4,
Line 4, delete "5,867,997" and insert therefor -- 5,867,977 --.

Column 6,
Line 64, after the first instance of "station" insert -- 23 --.
Line 64, after the second instance of "station" delete "23".

Signed and Sealed this

Twenty-second Day of November, 2005

JON W. DUDAS
*Director of the United States Patent and Trademark Office*